(12) United States Patent
Nakagome et al.

(10) Patent No.: US 12,503,342 B2
(45) Date of Patent: Dec. 23, 2025

(54) HOIST HOOK AND TRANSPORTING METHOD OF ARTICLE USING THE HOIST HOOK

(71) Applicant: NHK SPRING CO., LTD., Yokohama (JP)

(72) Inventors: Masashi Nakagome, Yokohama (JP); Hiroyuki Taneda, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 0 days.

(21) Appl. No.: 19/209,596

(22) Filed: May 15, 2025

(65) Prior Publication Data

US 2025/0270074 A1    Aug. 28, 2025

Related U.S. Application Data

(63) Continuation of application No. PCT/JP2023/036974, filed on Oct. 12, 2023.

(Continued)

(51) Int. Cl.
*B66C 1/28* (2006.01)
*B64D 9/00* (2006.01)

(52) U.S. Cl.
CPC . *B66C 1/28* (2013.01); *B64D 9/00* (2013.01)

(58) Field of Classification Search
CPC .... B66C 1/28; B66C 1/30; B66C 1/42; B66C 3/00; B64D 9/00

(Continued)

(56) References Cited

U.S. PATENT DOCUMENTS

| 1,822,629 | A | * | 9/1931 | Mcilvried | B66C 1/30 |
| | | | | | 294/67.31 |
| 3,154,339 | A | * | 10/1964 | Kaplan | B21B 39/00 |
| | | | | | 294/201 |

(Continued)

FOREIGN PATENT DOCUMENTS

| CN | 204917624 U | 12/2015 |
| CN | 206768905 U | 12/2017 |

(Continued)

OTHER PUBLICATIONS

Decision to Grant a Patent issued on Mar. 12, 2024 for corresponding Japanese Patent Application No. 2024-508773, along with an English machine translation (6 pages).

(Continued)

*Primary Examiner* — Paul T Chin
(74) *Attorney, Agent, or Firm* — HAUPTMAN HAM, LLP (57) ABSTRACT

A hoist hook includes a main plate, a first slide plate, a second slide plate, a first base, a second base, a pair of hooks, a flywheel, and rack. The first slide plate and the second slide plate are fixed to each other and are configured to be suspended from a radio-controlled unmanned aircraft and to slide vertically relative to the main plate while sandwiching the main plate. The first base and the second base are fixed to each other and are configured to slide vertically relative to the main plate while sandwiching the main plate. The pair of hooks are each rotatably linked to the first base and the second base. The flywheel is rotatably fixed to the main plate. The rack engages with the flywheel and is fixed to the first slide plate.

14 Claims, 10 Drawing Sheets

Related U.S. Application Data (60) Provisional application No. 63/426,133, filed on Nov. 17, 2022.

(58) Field of Classification Search
USPC .......................................................... 294/82.1
See application file for complete search history.

(56) References Cited

U.S. PATENT DOCUMENTS

| | | | | |
|---|---|---|---|---|
| 3,401,974 | A | * | 9/1968 | Marteelee ................. B66C 1/30 294/203 |
| 3,582,128 | A | * | 6/1971 | Martelee ................... B66C 1/30 294/115 |
| 4,261,609 | A | | 4/1981 | Kraszewski et al. |
| 5,687,931 | A | * | 11/1997 | Hogan ................. B64D 17/383 244/151 B |
| 2009/0026780 | A1 | | 1/2009 | Claraz et al. |
| 2015/0021948 | A1 | * | 1/2015 | Xiao .................... B25J 15/0028 294/198 |
| 2018/0244389 | A1 | * | 8/2018 | Herlocker ................. B66C 1/42 |
| 2020/0407061 | A1 | * | 12/2020 | Hafenrichter ............. B66C 1/28 |
| 2025/0263273 | A1 | * | 8/2025 | Nakagome ................ B66C 1/28 |

FOREIGN PATENT DOCUMENTS

| | | |
|---|---|---|
| CN | 108583903 A | 9/2018 |
| CN | 111960254 A | 11/2020 |
| CN | 212101652 U | 12/2020 |
| CN | 112158328 A | 1/2021 |
| CN | 114368674 A | 4/2022 |
| JP | S62-264191 A | 11/1987 |
| JP | H9-136786 A | 5/1997 |
| JP | 2002-128455 A | 5/2002 |
| JP | 2012-111570 A | 6/2012 |
| JP | 2021-50064 A | 4/2021 |
| JP | 2021-102521 A | 7/2021 |
| JP | 2022-74674 A | 5/2022 |
| JP | 2022-128628 A | 9/2022 |
| JP | 2022-128632 A | 9/2022 |
| KR | 2003-0008113 A | 1/2003 |
| WO | 2006/120363 A1 | 11/2006 |

OTHER PUBLICATIONS

International Search Report issued for corresponding International Patent Application No. PCT/JP2023/036974 on Nov. 21, 2023, along with an English translation (7 pages).
Written Opinion issued for corresponding International Patent Application No. PCT/JP2023/036974 on Nov. 21, 2023 (3 pages).
International Search Report issued for corresponding International Patent Application No. PCT/JP2023/036975 on Nov. 21, 2023, along with an English translation (5 pages).
Written Opinion issued for corresponding International Patent Application No. PCT/JP2023/036975 on Nov. 21, 2023 (3 pages).
Office Action issued for corresponding Taiwanese Patent Application No. 112143427 on Nov. 7, 2024, along with an English machine translation (7 pages).
Office Action issued for corresponding Taiwanese Patent Application No. 112143428 on Nov. 7, 2024, along with an English machine translation (6 pages).
English translation of Written Opinion of the International Searching Authority issued on Nov. 21, 2023 for corresponding International Patent Application No. PCT/JP2023/036974 (3 pages).
English translation of Written Opinion of the International Searching Authority issued on Nov. 21, 2023 for corresponding International Patent Application No. PCT/JP2023/036975 (3 pages).
Office Action issued on Aug. 30, 2025, for corresponding Chinese Patent Application No. 202380073415.9, along with an English machine translation (13 pages).

* cited by examiner

FIG. 1

Front View

FIG. 2

Back View

FIG. 3

Perspective View

FIG. 4

Perspective View

Front View

Back View

HOIST HOOK AND TRANSPORTING METHOD OF ARTICLE USING THE HOIST HOOK

CROSS-REFERENCE TO RELATED APPLICATIONS

This application is a Continuation of International Patent Application No. PCT/JP2023/036974, filed on Oct. 12, 2023, which claims the benefit of priority to United State Provisional Patent Application No. 63/426,133, filed on Nov. 17, 2022, the entire contents of which are incorporated herein by reference.

FIELD

An embodiment of the present invention relates to a hoisting device for suspending articles from a radio-controlled unmanned aircraft (hereinafter, also referred to as a drone) and transporting the articles and a transporting method of the articles using the hoisting device.

BACKGROUND

In recent years, drones have been used in a variety of fields, and drones are not only utilized for taking pictures from the sky but are also applied as a means for transporting articles such as luggage and materials. For example, Japanese laid-open patent applications No. 2002-128455, 2022-128632, 2021-050064, 2021-102521, and 2022-128628 disclose a hoisting device (hereinafter, referred to as a hoist hook) for transporting articles using a drone.

SUMMARY

An embodiment of the present invention is a hoist hook. The hoist hook includes a main plate, a first slide plate, a second slide plate, a first base, a second base, a pair of hooks, a flywheel, and a rack. The first slide plate and the second slide plate are fixed to each other and are configured to be suspended from a radio-controlled unmanned aircraft and to slide vertically relative to the main plate while sandwiching the main plate. The first base and the second base are fixed to each other and are configured to slide vertically relative to the main plate while sandwiching the main plate. The pair of hooks are each rotatably linked to the first base and the second base. The flywheel is rotatably fixed to the main plate. The rack engages with the flywheel and is fixed to the first slide plate.

An embodiment of the present invention is a method for transporting an article. The method includes: suspending an article from a hoist hook; moving the hoist hook using a radio-controlled unmanned aircraft; and releasing the article from the hoist hook. The hoist hook includes a main plate, a first slide plate, a second slide plate, a first base, a second base, a pair of hooks, a flywheel, and a rack. The first slide plate and the second slide plate are fixed to each other and are configured to be suspended from a radio-controlled unmanned aircraft and to slide vertically relative to the main plate while sandwiching the main plate. The first base and the second base are fixed to each other and are configured to slide vertically relative to the main plate while sandwiching the main plate. The pair of hooks are each rotatably linked to the first base and the second base. The flywheel is rotatably fixed to the main plate. The rack engages with the flywheel and is fixed to the first slide plate.

DESCRIPTION OF EMBODIMENTS

Hereinafter, each embodiment of the present invention is explained with reference to the drawings. The invention can be implemented in a variety of different modes within its concept and should not be interpreted only within the disclosure of the embodiments exemplified below.

The drawings may be illustrated so that the width, thickness, shape, and the like are illustrated more schematically compared with those of the actual modes in order to provide a clearer explanation. However, the drawings are only an example, and do not limit the interpretation of the invention. In the specification and the drawings, the same reference number is provided to an element that is the same as that which appears in preceding drawings, and a detailed explanation may be omitted as appropriate.

Hereinafter, a hoist hook 100 and a transporting method of articles using the hoist hook 100 according to an embodiment of the present invention are described. The hoist hook 100 is a hook capable of being suspended from a drone and is further configured to suspend articles. As described below, the hoist hook 100 is able to automatically open the hooks and release the articles from the hoist hook 100 when unloading the articles to the ground without the hook being unintentionally opened during transport of the articles, i.e., during flight of the drone.

1. Structure

Figure 1:
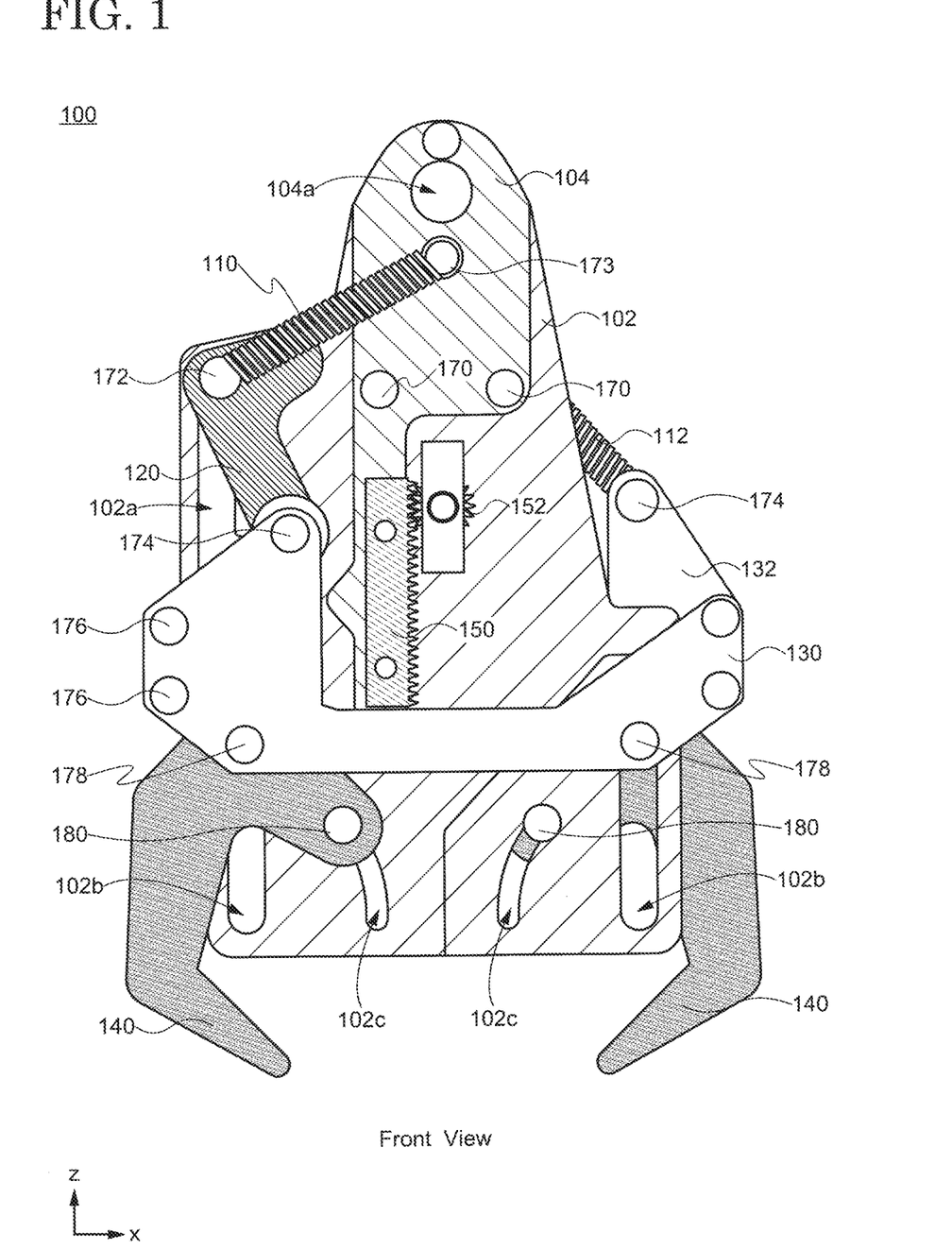
FIG. 1 is a schematic front view of a hoist hook according to an embodiment of the present invention.
Figure 2:
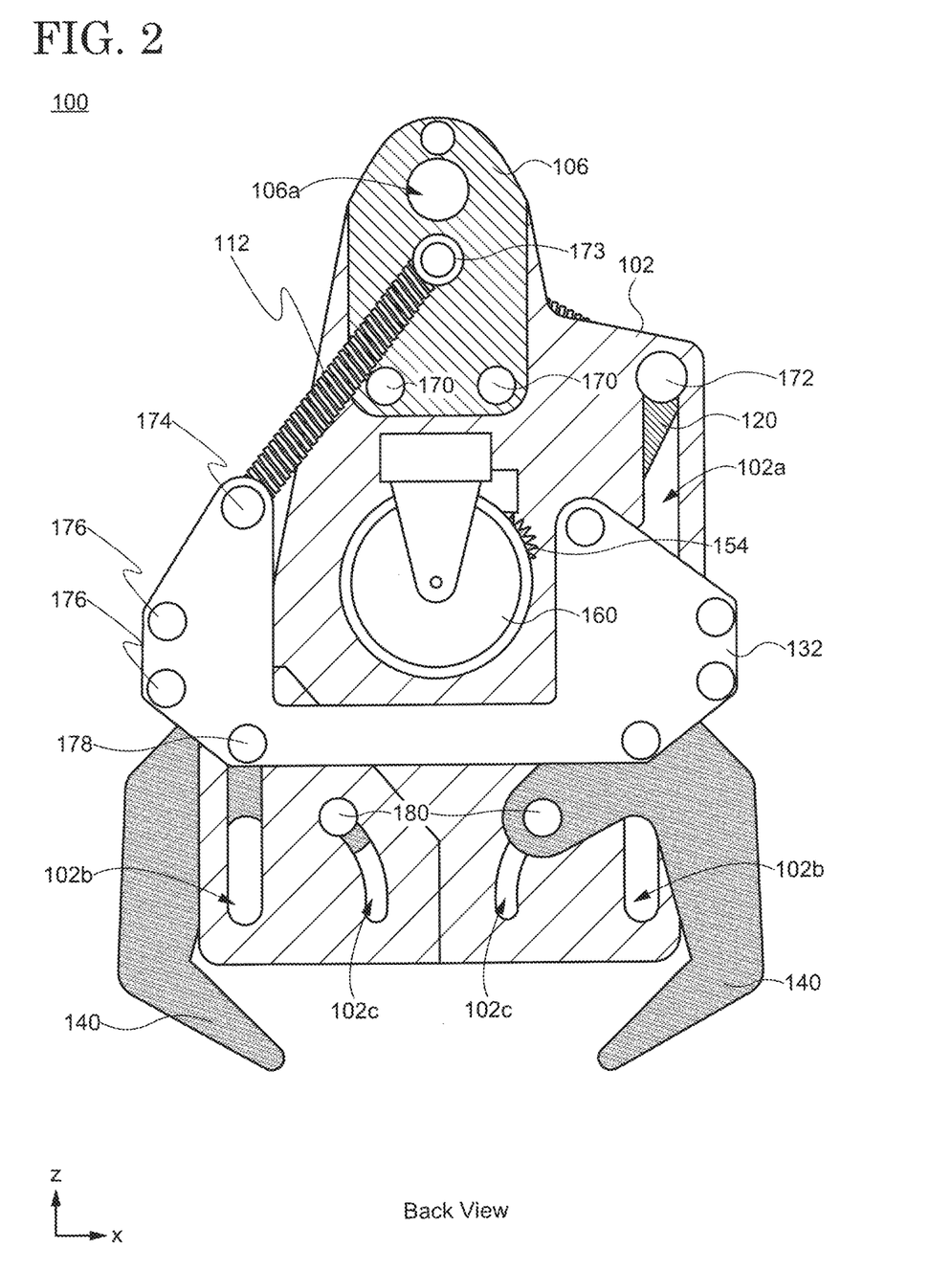
FIG. 2 is a schematic back view of a hoist hook according to an embodiment of the present invention.
Figure 3:
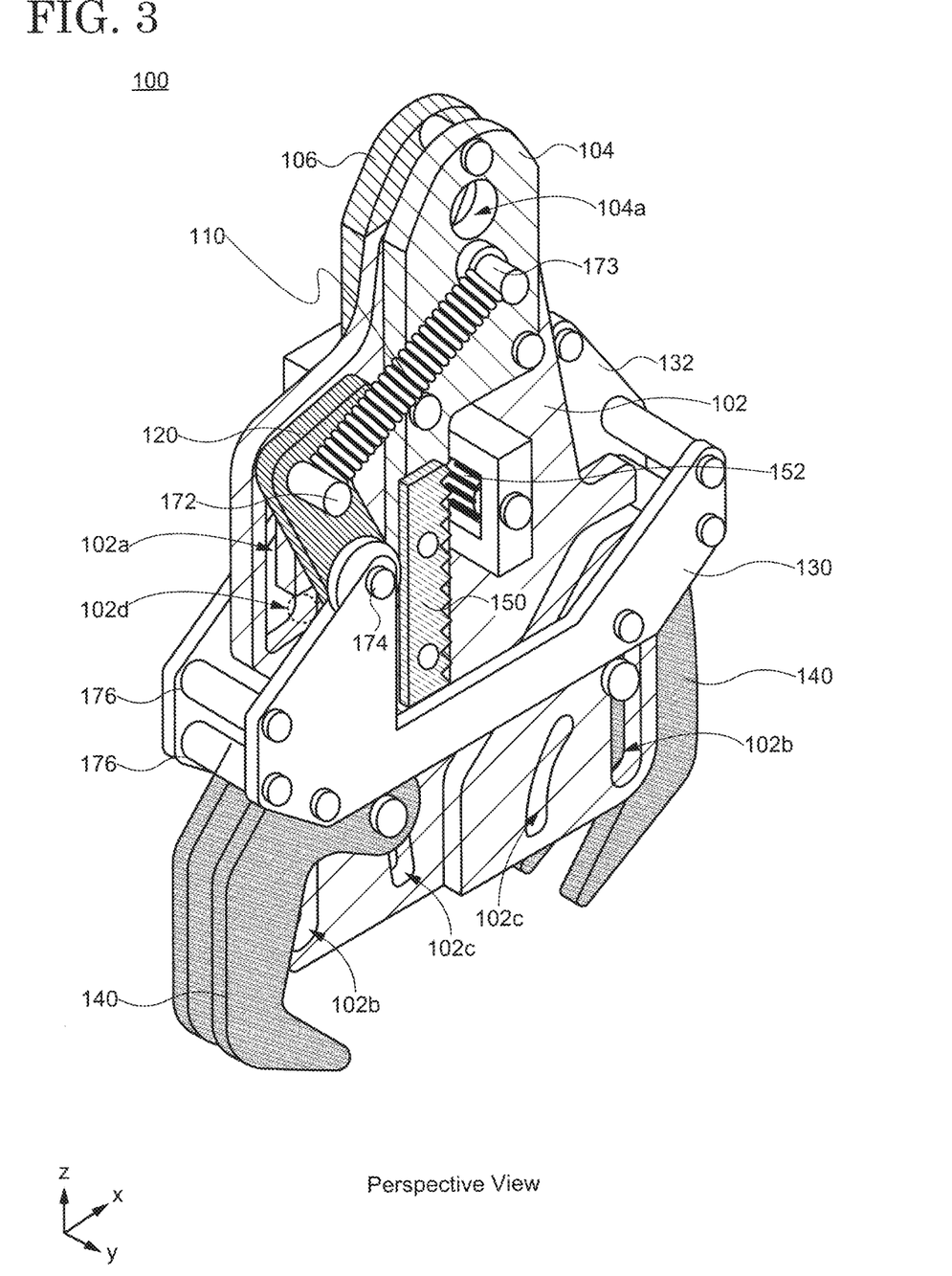
FIG. 3 is a schematic perspective view of a hoist hook according to an embodiment of the present invention.
Figure 4:
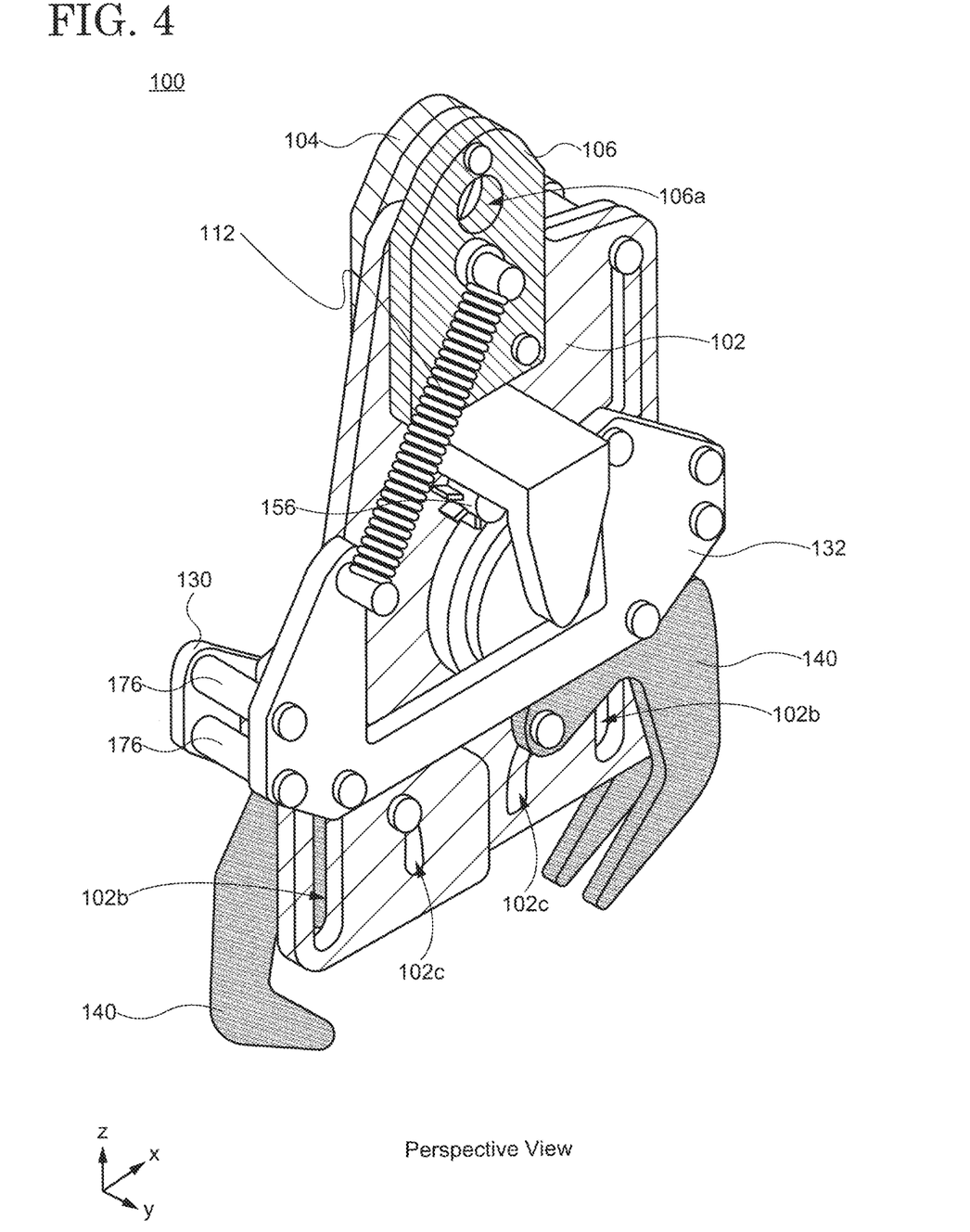
FIG. 4 is a schematic perspective view of a hoist hook according to an embodiment of the present invention.
Figure 5:
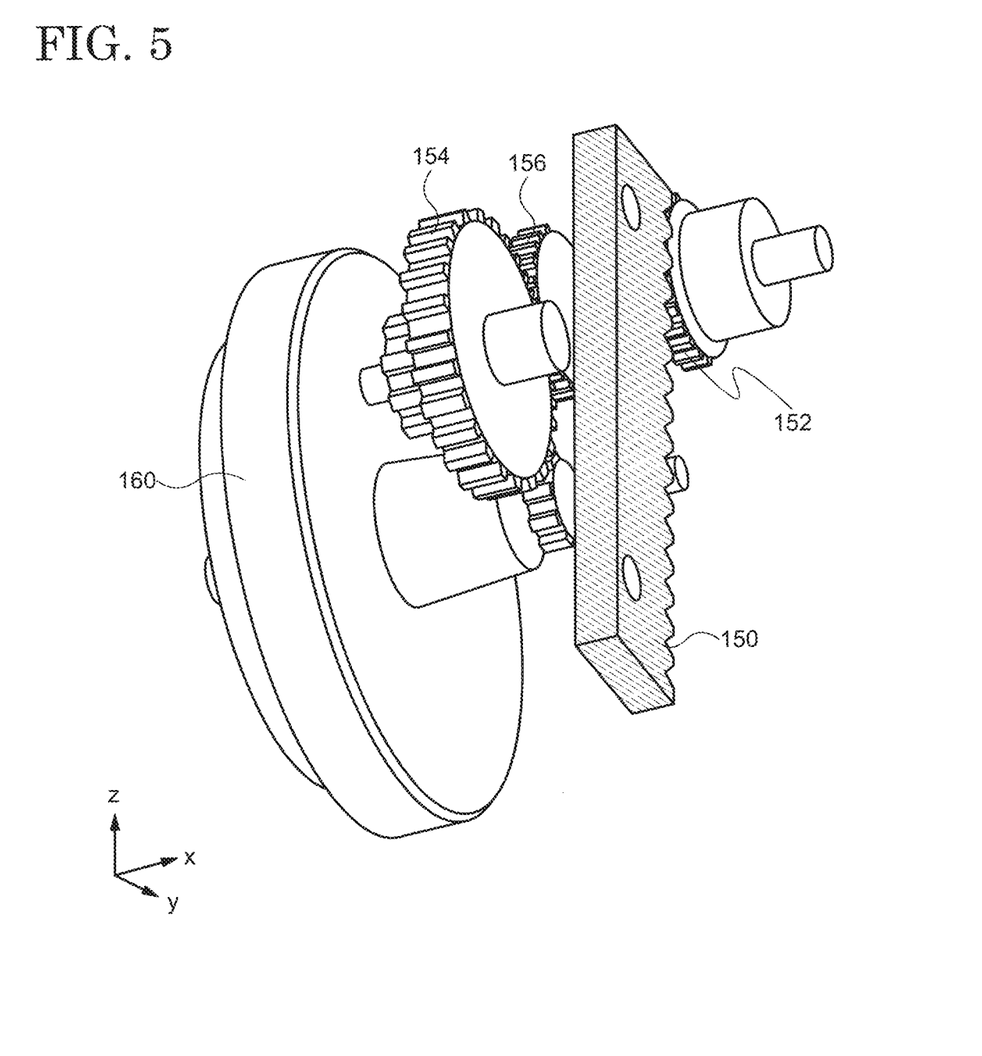
FIG. 5 is a schematic perspective view of a portion of a hoist hook according to an embodiment of the present invention.

FIG. 1 and FIG. 2 are respectively schematic front and back views of the hoist hook 100 according to an embodiment of the present invention, and FIG. 3 and FIG. 4 are schematic perspective views of the hoist hook 100. FIG. 5 is a schematic perspective view of a flywheel 160 and surrounding components attached to the hoist hook 100. FIG. 6 to FIG. 10 are schematic front or back views showing a process of suspending an article from the hoist hook 100. Note that a latch 120, a first spring 110, and the like described below are not depicted in FIG. 7 through FIG. 9 for visibility. Hereafter, a vertical direction in a state where the hoist hook 100 is suspended by a drone or the like is referred to as a vertical or z-direction. The direction perpendicular to the z-direction and a normal direction with respect to a main surface of a main plate 102 described below is referred to as a x-direction, while the direction perpendicular to the z-direction and the x-direction is referred to as a y-direction.

As can be understood from these drawings, the hoist hook 100 has the following fundamental components. These components may include a metal such as iron, aluminum, and copper or an alloy such as stainless steel and brass or may include a resin such as an epoxy resin, a phenolic resin, and a fluororesin. The resin may be a fiber-reinforced plastic containing glass or carbon fibers.

Main plate 102
A pair of slide plates (first slide plate 104, second slide plate 106)
Latch 120
A pair of bases (first base 130, second base 132)
First spring 110
Second spring 112
Hook 140
Rack 150
Pinion gear 152
Flywheel 160

(1) Main Plate

The main plate 102 is a part for supporting the various components attached to the main plate 102. The main plate 102 is provided with grooves 102b and 102c for the hook 140 to rotate while moving vertically, a groove 102a for the latch 120 to move vertically, a groove 102f for the first base 130 and the second base 132 to move vertically (see FIG. 7.), grooves 102g for the first slide plate 104 and the second slide plate 106 to move vertically (see FIG. 8 and FIG. 9), and the like. Moreover, although not illustrated, an opening is also provided in the main plate 102 for inserting a shaft of the pinion gear 152.

(2) First Slide Plate, Second Slide Plate, and First and Second Springs

The first slide plate 104 and the second slide plate 106 are secured to each other with one or a plurality of slide pins 170 so as to face each other while sandwiching at least a portion of the main plate 102. Since the main plate 102 is provided with one or a plurality of grooves 102g for vertically moving the slide pins 170 while being inserted therethrough, the main plate 102 is capable of moving vertically relative to the first slide plate 104 and the second slide plate 106. In addition, the first slide plate 104 and the second slide plate 106 are provided with hanging holes 104a and 106a, respectively, for suspending the hoist hook 100 from the drone. The grooves 102g provided in the main plate 102 for the slide pins 170 to move are formed so as not to overlap the hanging holes 104a and 106a in the y-direction when the main plate 102 moves vertically relative to the first slide plate 104 and the second slide plate 106.

The rack 150 extending in the vertical direction is fixed to the first slide plate 104. The first slide plate 104 is also provided with the first spring 110. Specifically, one terminal of the first spring 110 is linked to the first slide plate 104, while the other terminal is linked to the latch 120. Since the first spring 110 is also linked to the first slide plate 104 and the latch 120 with the slide pins 173 and 172, respectively, the first spring 110 is capable of rotating about an axis of the slide pin 173, i.e., an axis perpendicular to the main surface of the first slide plate 104.

The second spring 112 is provided to the second slide plate 106. Similar to the first spring 110, since one terminal of the second spring 112 is also linked to the second slide plate 106 with the slide pin 173, the second spring 112 is capable of rotating about the axis of the slide pin 173, i.e., an axis perpendicular to the main surface of the second slide plate 106.

(3) First Base, Second Base, and Latch

The first base 130 and the second base 132 are arranged to sandwich the main plate 102 and are secured to each other with a plurality of slide pins 174, 176, and 178. As mentioned above, the main plate 102 is provided with the grooves 102b which are arranged so that the slide pins 178 securing the first base 130 and the second base 132 pass therethrough and move vertically. Thus, the first base 130 and the second base 132 are also capable of moving vertically relative to the main plate 102.

The other terminal of the second spring 112 is linked to the second base 132 with the slide pin 174. Meanwhile, the other terminal of the first spring 110 is connected to the first base 130 via the latch 120. The latch 120 is a part having a function to temporarily fix the positions of the first base 130 and the second base 132 with respect to the main plate 102 and has an L-shape. The other terminal of the first spring 110 is linked to a bent portion of the L-shape of the latch 120 via the slide pin 172. Furthermore, the main plate 102 is provided with the groove 102a so that the slide pin 172 linking the latch 120 and the first spring 110 is able to pass therethrough and move vertically as described above. In addition, the latch 120 is linked to the first base 130 via the slide pin 174 at one terminal (one terminal of the two straight sections connected through the bent portion). Thus, the latch 120 is able to follow the vertical movement of the first base 130 and the second base 132 and move in the vertical direction while rotating about the slide pins 172 and 174 with respect to the first spring 110 and the first base 130, respectively.

Note that, as shown in FIG. 3, at the lower portion of the groove 102a for the slide pin 172 linking the first spring 110 and the latch 120 to pass through the main plate 102, an escape groove 102d (see dotted circle) is provided to temporarily secure the slide pin 172. Hence, the groove 102a is an L-shaped groove with a longitudinal portion of the L-shaped groove arranged parallel to the vertical direction (i.e., the direction in which the first slide plate 104 and the second slide plate 106 slide relative to the main plate 102), and a lateral portion serves as the escape groove 102d temporarily fitting the slide pin 172 when the first base 130 and the second base 132 slide. The position and the size of the escape groove 102d are set so that the restoring force of the first spring 110 and the second spring 112 works when the slide pin 172 fits within the escape groove 102d and the slide pin 172 does not move in this state.

Here, the first spring 110 and the second spring 112 are respectively linked to the first slide plate 104 and the second slide plate 106 using the same slide pin 173. Alternatively, the terminals of the first spring 110 and the second spring 112 at which the first spring 110 and the second spring 112 are respectively linked to the first slide plate 104 and the second slide plate 106 overlap in the y-direction. However, the first spring 110 extends on one hook 140 side while the second spring 112 extends on the other hook 140 side. Therefore, since the vector of the restoring force generated when the first spring 110 and the second spring 112 are extended is in the z-direction or substantially in the z-direction, it is possible to substantially fix the moving directions of the first base 130 and the second base 132 in the vertical direction, allowing stable vertical movement of the first base 130 and the second base 132.

(4) Hook

The pair of hooks 140 have a hook shape and are partially sandwiched between the first base 130 and the second base 132, where one of the slide pins 178 securing the first base 130 and the second base 132 passes through an end portion of one hook 140 and the other slide pin 178 passes through an end portion of the other hook 140 (see FIG. 1). This configuration allows the pair of hooks 140 to be respectively linked to the first base 130 and the second base 132. Each hook 140 is further provided with a slide pin 180 for rotation passing through the main plate 102. The slide pins 178 are arranged in the straight grooves 102b extending in the z-direction and provided in the main plate 102. The slide pins 180 for rotation, on the other hand, are disposed within curved or arc-shaped grooves 102c provided in the main plate 102. The grooves 102c are sandwiched between the pair of straight grooves 102b and are provided such that the distance therebetween increases as they approach the hanging holes 104a and 106a. Thus, when the first base 130 and the second base 132 move downward relative to the main plate 102, the slide pins 180 move along the grooves 102c. As a result, the pair of hooks 140 can be rotated about an axis extending in the y-direction relative to the first base 130 and second base 132, respectively, and closed. Conversely, when the first base 130 and second base 132 are moved upward relative to the main plate 102, the hooks are rotated in the opposite direction and opened.

(5) Rack, Pinion Gear, and Flywheel

The rack 150 is fixed to the first slide plate 104 and extends vertically. The pinion gear 152 engaging with this rack 150 is provided so as to pass through the main plate 102. As shown in FIG. 5 and the like, the flywheel 160 engaging with the pinion gear 152 directly or via one or a plurality of relay gears 154 and 156 is rotatably fixed to the second slide plate 106 side of the main plate 102. As will be described in detail below, when the drone rises or falls rapidly during transportation of articles suspended from the hook 140, the load of the articles on the hook 140 temporarily changes, resulting in vertical movement of the main plate 102 relative to the first slide plate 104 and the second slide plate 106. Since the rack 150 is fixed to the first slide plate 104 and the pinion gear 152 is connected to the main plate 102, the vertical movement of the main plate 102 relative to the first slide plate 104 and the second slide plate 106 causes the rack 150 to move vertically relative to the pinion gear 152. This movement causes the pinion gear 152 to rotate, by which the flywheel 160 can be driven. The flywheel 160 is a rotating body with a large inertia moment, where, although a large force is required to start the rotation, once the rotation starts, the inertia moment thereof is utilized to maintain the rotational motion. Therefore, a large force is required to vertically move the rack 150 in a stationary state. In other words, the flywheel 160 functions as a resistance element resisting the vertical movement of the rack 150, i.e., as a resistance element resisting the vertical movement of the main plate 102 relative to the first slide plate 104 and second slide plate 106. The magnitude of the resistance of the resistance element can be adjusted by adjusting the structure of the flywheel 160 as appropriate. Note that the arrangement of the rack 150, the pinion gear 152, and the flywheel 160 is not limited to the illustrated arrangement, and some or all of these elements may be arranged on the first slide plate 104 side.

2. Operation of Hoist Hook and Transporting Method of Articles (1) Hanging of Articles In the initial state, the slide pin 172 passing through the bent portion of the latch 120 is not located in the escape groove 102d, but is located in the longitudinal portion of the groove 102a. In this state, the latch 120 is pulled upward by the restoring force of the first spring 110 and the second spring 112. Thus, the first base 130, the second base 132, and the hooks 140 linked thereto are also pulled upward, and the hooks 140 remain in an open state (see FIG. 1 to FIG. 4).

Figure 6:
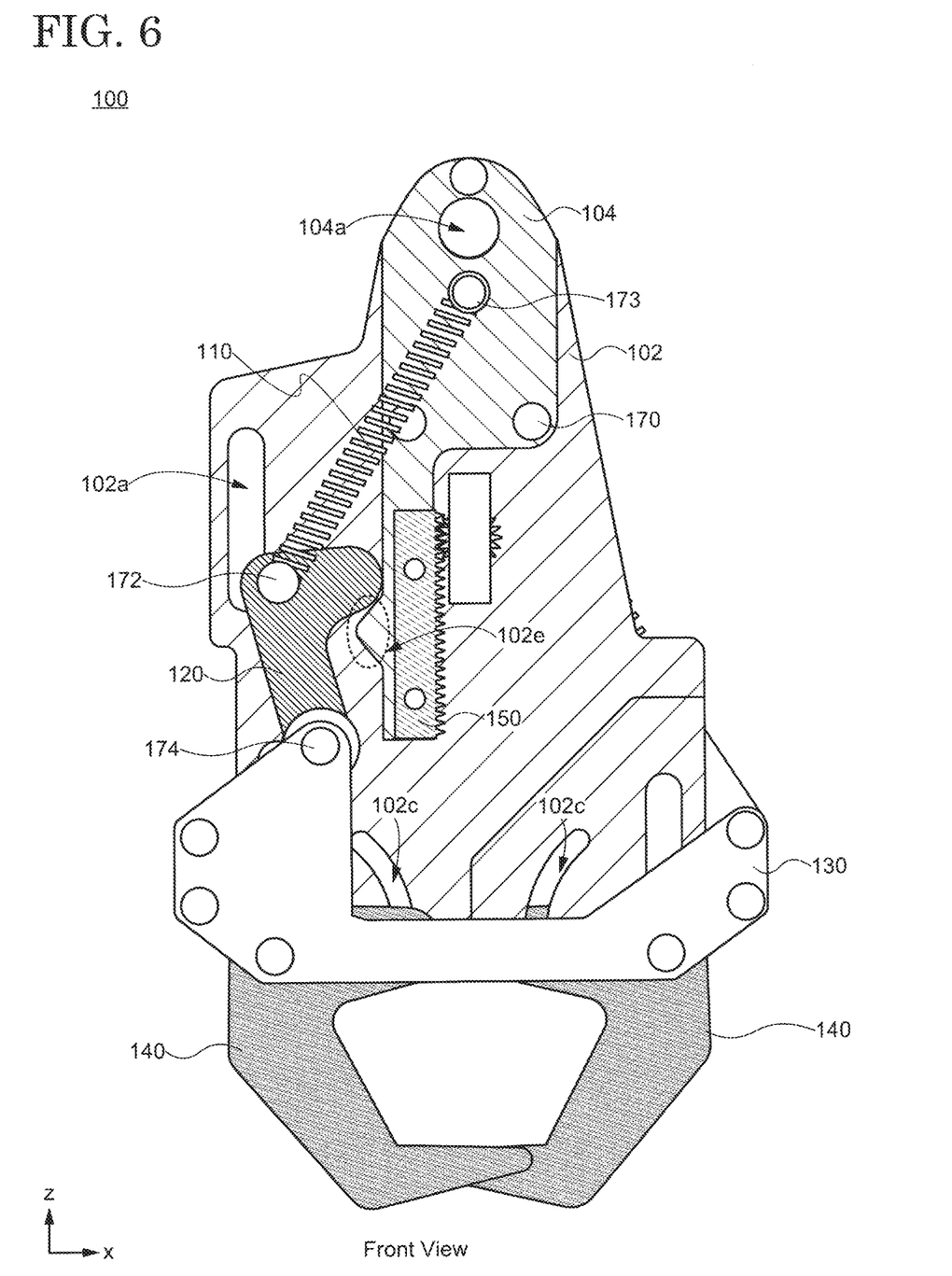
FIG. 6 is a schematic front view of a hoist hook according to an embodiment of the present invention.
Figure 7:
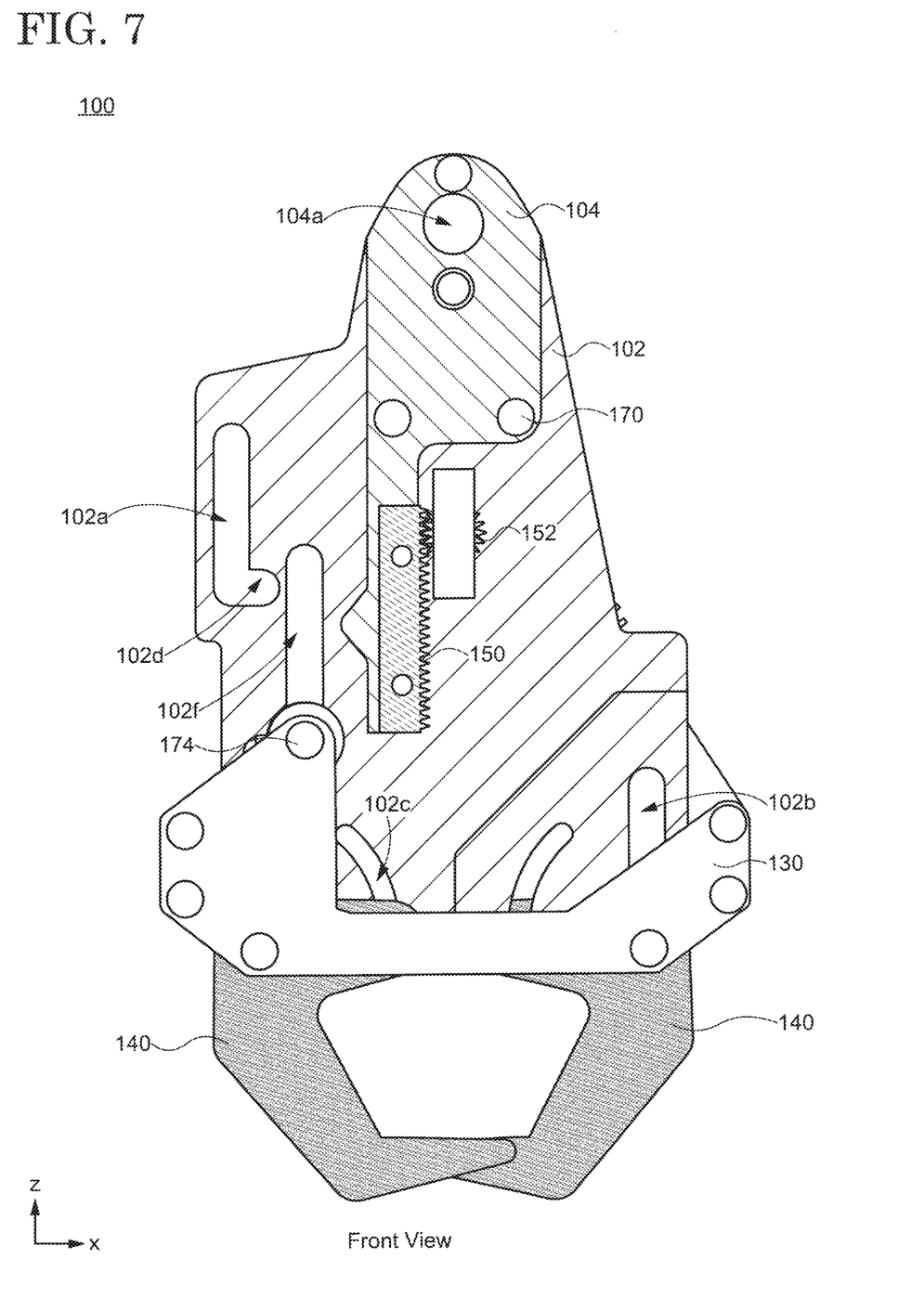
FIG. 7 is a schematic front view of a hoist hook according to an embodiment of the present invention.
Figure 8:
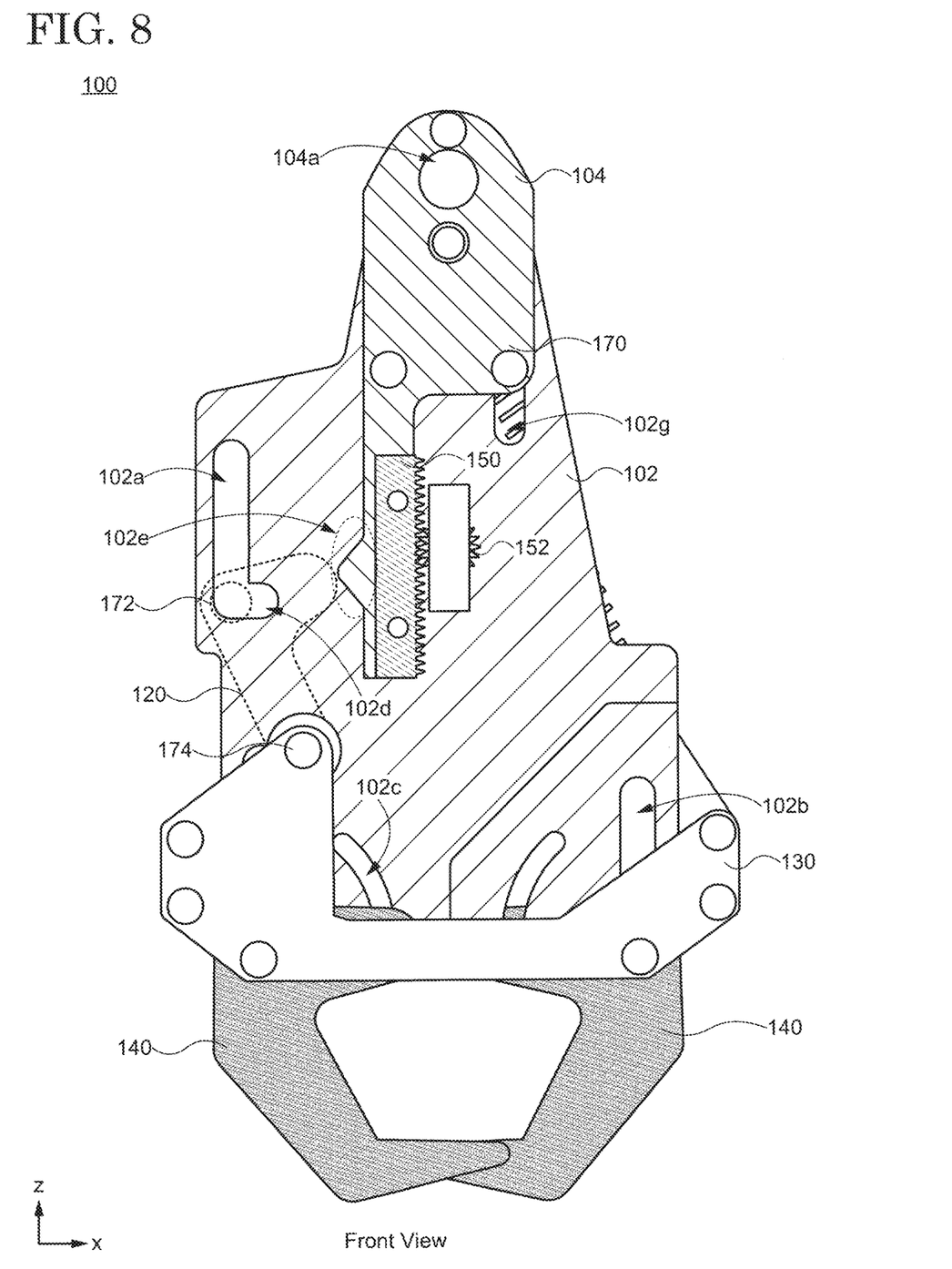
FIG. 8 is a schematic front view of a hoist hook according to an embodiment of the present invention.
Figure 9:
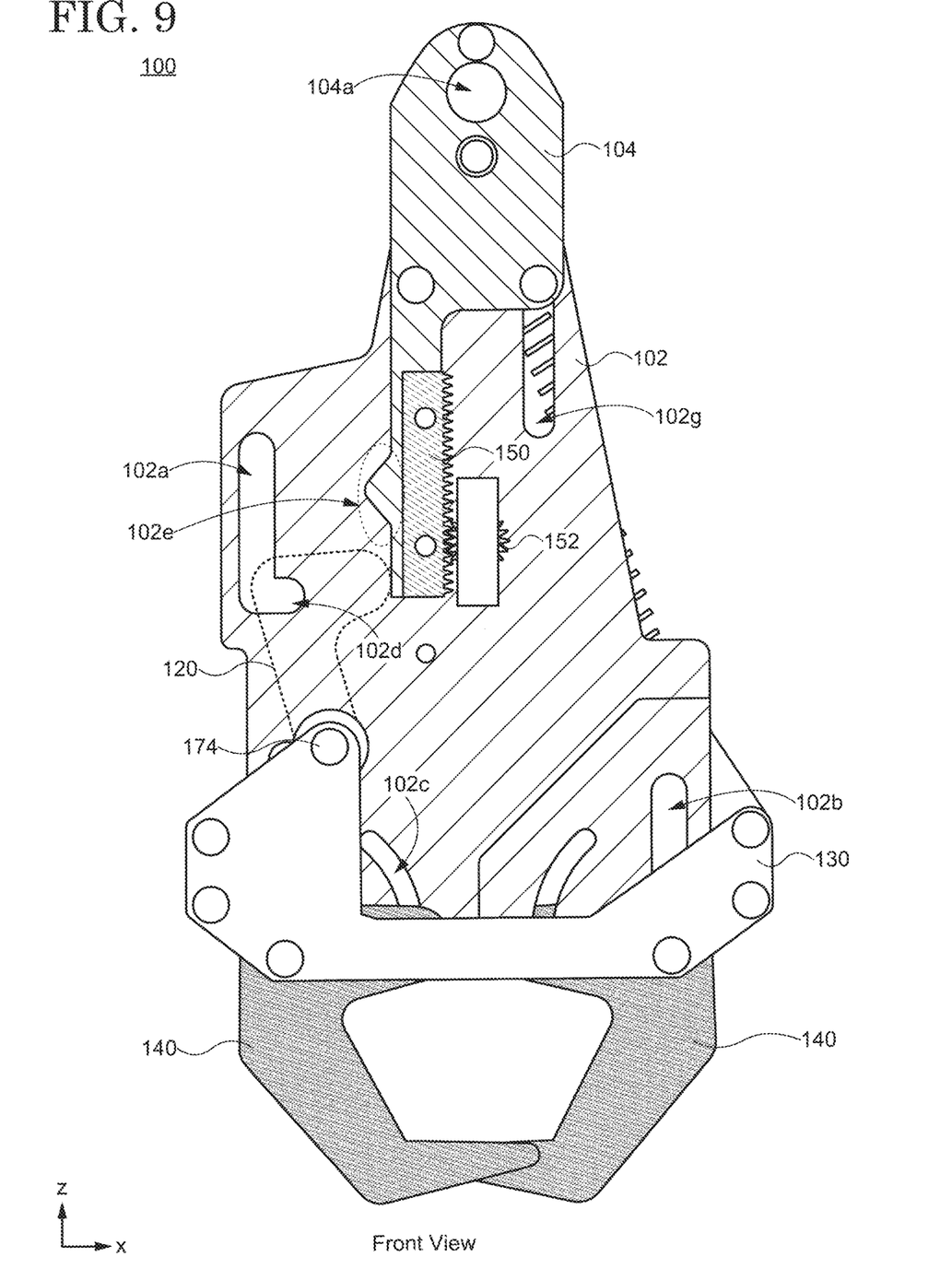
FIG. 9 is a schematic front view of a hoist hook according to an embodiment of the present invention.
Figure 10:
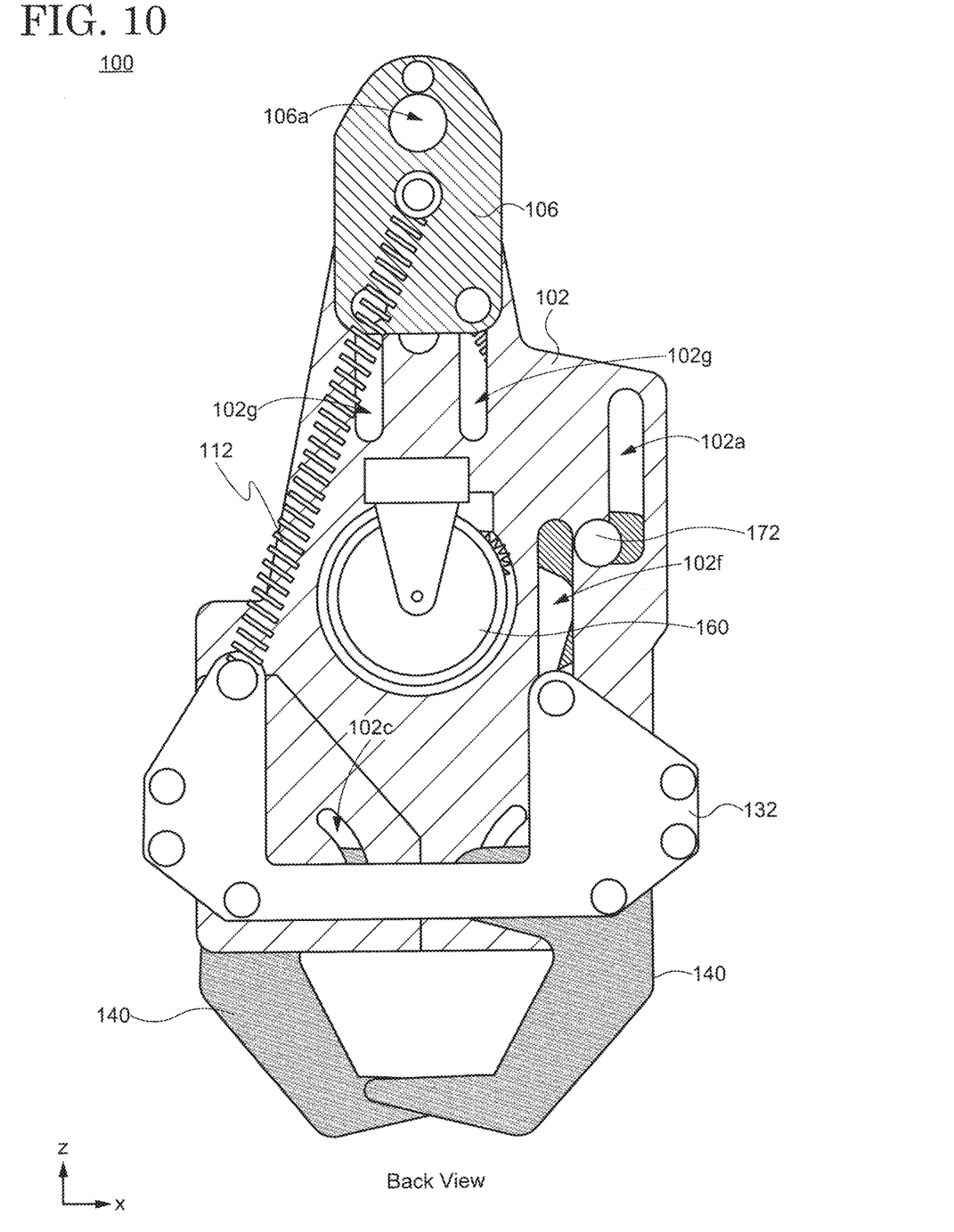
FIG. 10 is a schematic back view of a hoist hook according to an embodiment of the present invention.

When hanging articles, the first base 130 and second base 132 are moved downward relative to the main plate 102 so that the slide pin 172 passing through the bent portion of the latch 120 engages with the escape groove 102d (FIG. 6 and FIG. 7). Since the slide pins 180 passing through the grooves 102c (see FIG. 1 and FIG. 2.) move downward through the grooves 102c at this time, the hooks 140 are rotated and closed (FIG. 6 and FIG. 7). Since the slide pin 174 is located at the lowermost portion of the groove 102f, the movement of the first base 130 and the second base 132 downward (toward the hook 140 side) with respect to the main plate 102 is restricted. Hereafter, this state is referred to as a standby state. In the standby state, the latch 120 is locked and the hooks 140 remain in the closed state because the slide pin 172 engages with the escape groove 102d. In this standby state, the articles can be suspended from the hoist hook 100 by hanging the articles on the hooks 140. Normally, the full load of the articles is not applied to the hook 140 at this stage because the articles are placed on the ground, floor, or the like.

(2) Takeoff of Drone

When the drone then takes off and the articles leave the ground or the floor, the hooks 140 are subjected to the full load of the articles. Then the main plate 102 and the latch 120, in addition to the first base 130 and second base 132 linked to the hooks 140, move downward relative to the first slide plate 104 and second slide plate 106. When the slide pin 170 reaches the uppermost portion of the groove 102g, the downward movement of the main plate 102 is restricted. The state at this point is called a transport state.

Here, the first slide plate 104 is configured to temporarily unlock the latch 120 when transitioning from the standby state to the transport state and to lock the latch 120 again in the transport state. Specifically, as shown in FIG. 6 to FIG. 9, a side surface of the first slide plate 104 may be provided with a protruding portion 102e which slides the slide pin 172 in the x-direction (i.e., along the lateral portion) to shift the slide pin 172 to the longitudinal portion of the groove 102a from the escape groove 102d while rotating the latch about the slide pin 174 when the latch 120 in the standby state moves downward relative to the first slide plate 104 and which allows the slide pin 172 to engage with the escape groove 102d again while rotating the latch 120 backwards when the latch 120 further moves downward. The protruding portion 102e is arranged so that the slide pin 172 engages with the escape groove 102d and the bent portion of the latch 120 is located above the protruding portion 102e in the standby state and that the slide pin 172 engages with the escape groove 102d again and the bent portion is located under the protruding portion 102e when the main plate 102 moves downward relative to the first slide plate 104 and the second slide plate 106. The protruding portion 102e allows the latch 120 to contact the protruding portion 102e and the slide pin 172 to reversibly move between the escape groove 102d and the longitudinal portion when the main plate 102 moves vertically relative to the first slide plate 104 and the second slide plate 106. Therefore, the latch 120 can be locked not only in the standby state but also in the transport state, allowing the hooks 140 to be maintained in a closed state.

(3) Transportation and Release of Articles

After transitioning to the transport state, the articles are moved by the drone and are transported above a predetermined location. The articles are then slowly lowered to the ground or floor. When the article contacts the ground or floor, the load of the articles on the hooks 140 gradually decreases. As a result, the main plate 102 moves upward relative to the first slide plate 104 and the second slide plate 106 due to the restoring force of the first spring 110 and the second spring 112. When the load of the articles disappears, the protruding portion 102e contacts the latch 120, and the slide pin 172 moves from the escape groove 102d to the longitudinal portion of the groove 102a (see FIG. 8.). That is, the latch 120 is unlocked. Then, the slide pin 172 moves upward along the groove 102a and returns to the initial state due to the restoring force of the first spring 110 and the second spring 112, thereby opening the hooks 140. Therefore, effort to remove the articles from the hoist hook 100 is unnecessary, thereby saving human resources and improving work efficiency related to transportation. Thus, the protruding portion 102e expresses a function of locking the latch 120 in the transport state and a function of automatically unlocking and releasing the hooks 140 when the drone lands.

Here, if the drone suddenly descends during flight due to an unexpected cause such as the effect of air currents or operation error, the load of the articles is instantly lost or rapidly reduced. At this time, if the hoist hook 100 attempts to return to the initial state through the standby state, the hooks 140 open unintentionally, causing the articles to fall. However, in the hoist hook 100, the upward movement of the main plate 102, which occurs when the load of the articles is instantaneously lost or rapidly reduced, is strictly restricted by the flywheel 160 functioning as a resistance against the relative vertical movement of the main plate 102. That is, the vertical movement is delayed by the flywheel 160. Furthermore, when the articles are being transported, the latch 120 is locked to prohibit vertical movement of the latch 120 along the groove 102a. Thus, even in the event of a momentary loss or rapid reduction in load, the upward movement of the main plate 102 with respect to the first slide plate 104 and the second slide plate 106 is delayed, and the unintended opening of the hooks 140 caused by the unlocking of the latch 120 is prevented, thereby preventing dropping of articles.

As described above, the use of the hoist hook 100 according to an embodiment of the present invention prevents the falling of articles caused by air currents or operation errors of the drone when transporting articles using the drone. Furthermore, the cumbersome task of removing the articles from the drone can be eliminated. These features not only save human resources but also contribute to the safe and highly efficient transportation of articles.

The aforementioned modes described as the embodiments of the present invention can be implemented by appropriately combining with each other as long as no contradiction is caused. Furthermore, any mode which is realized by persons ordinarily skilled in the art through the appropriate addition, deletion, or design change of elements or through the addition, deletion, or condition change of a process on the basis of each embodiment is included in the scope of the present invention as long as they possess the concept of the present invention.

It is understood that another effect different from that provided by each of the aforementioned embodiments is achieved by the present invention if the effect is obvious from the description in the specification or readily conceived by persons ordinarily skilled in the art.

What is claimed is:

1. A hoist hook comprising:
   a connection member for connecting to a radio-controlled unmanned aircraft;
   a rack fixed to the connection member;
   a base configured to slide relative to the connection member along a longitudinal direction of the rack;
   a pair of hooks linked to the base and configured to rotate about a linked portion with the base and to open and close as the hooks rotates, and to suspend an article when closed and release the article when opened; and
   a flywheel linked to the rack via a gear.

2. The hoist hook according to claim 1,
   wherein the pair of hooks is configured to partly overlap each other in a direction parallel to a rotation axis of the hooks in a closed state.

3. The hoist hook according to claim 1, further comprising a spring linking the base and the connection member to each other.

4. The hoist hook according to claim 1, further comprising a latch configured to rotate relative to the base,
   wherein the latch is configured to exist in a locked state and an unlocked state, and
   wherein the latch is configured to maintain the pair of hooks in the locked state and to open the pair of hooks in the unlocked state.

5. The hoist hook according to claim 4,
   wherein the connection member has a protruding portion protruding toward the latch, and
   wherein the latch is arranged so as to contact the protruding portion when the connection member slides.

6. The hoist hook according to claim 1,
   wherein the flywheel is arranged so as to be driven by the gear which rotates when the base and the connection member relatively slide with each other.

7. The hoist hook according to claim 1,
   wherein the flywheel functions as a resistance to a relative sliding between the base and the connection member.

8. A method for transporting an article, the method comprising:
   suspending an article from a hoist hook;
   moving the hoist hook using a radio-controlled unmanned aircraft; and
   releasing the article from the hoist hook,
   wherein the hoist hook comprises:
      a connection member for connecting to the radio-controlled unmanned aircraft;
      a rack fixed to the connection member;
      a base configured to slide relative to the connection member along a longitudinal direction of the rack;
      a pair of hooks linked to the base and configured to rotate about a linked portion with the base and to open and close as the hooks rotate; and
      a flywheel linked to the rack via a gear.

9. The method according to claim 8,
   wherein the pair of hooks is configured to partly overlap each other in a direction parallel to a rotation axis of the hooks in a closed state.

10. The method according to claim 8,
    wherein the hoist hook further comprises a spring connecting the base and the connection member to each other.

11. The method according to claim 8,
wherein the hoist hook further comprises a latch configured to rotate relative to the base,
wherein the latch is configured to exist in a locked state and an unlocked state, and
wherein the latch is configured to maintain the pair of hooks in the locked state and to open the pair of hooks in the unlocked state.

12. The method according to claim 8,
wherein the flywheel is arranged so as to be driven by the gear which rotates by a relative sliding between the base and the connection member.

13. The method according to claim 8,
wherein the flywheel functions as a resistance to a relative sliding between the base and the connection member.

14. The method according to claim 11,
wherein the connection member has a protruding portion protruding toward the latch, and
wherein the latch is arranged so as to contact the protruding portion when the connection member slides.

\* \* \* \* \*